US009384055B2

(12) United States Patent
Wade (10) Patent No.: US 9,384,055 B2
(45) Date of Patent: *Jul. 5, 2016

(54) PROGRAMMATIC LOAD-BASED MANAGEMENT OF PROCESSOR POPULATION

(75) Inventor: Brian K. Wade, Apalachin, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 211 days.

This patent is subject to a terminal disclaimer.

(21) Appl. No.: 13/447,406

(22) Filed: Apr. 16, 2012

(65) Prior Publication Data

US 2013/0275594 A1    Oct. 17, 2013

(51) Int. Cl.
*G06F 9/50* (2006.01)

(52) U.S. Cl.
CPC .............. *G06F 9/505* (2013.01); *G06F 9/5083* (2013.01); *G06F 2209/5022* (2013.01)

(58) Field of Classification Search
CPC .............. H04L 47/70; H04L 29/08153; H04L 29/08297; H04L 29/0845; H04L 29/08459; H04L 29/08468; H04L 29/08549; G06F 11/0724; G06F 11/0751; G06F 11/1428; G06F 11/2242
USPC ........................................................ 709/226
See application file for complete search history.

(56) References Cited

U.S. PATENT DOCUMENTS

| 6,442,583 | B1 | 8/2002 | Eilert et al. |
| 7,685,439 | B2 * | 3/2010 | Drescher ....................... 713/300 |
| 7,761,548 | B2 * | 7/2010 | Snyder et al. ................. 709/223 |
| 8,046,767 | B2 * | 10/2011 | Rolia et al. .................... 718/104 |
| 8,108,875 | B2 * | 1/2012 | Dillenberger et al. ........ 718/104 |
| 8,490,062 | B2 * | 7/2013 | Bondi et al. ................... 717/128 |
| 2002/0165900 | A1 | 11/2002 | Kubo et al. |
| 2004/0181370 | A1 * | 9/2004 | Froehlich et al. ............. 702/187 |
| 2005/0050198 | A1 | 3/2005 | Mizoguchi |
| 2005/0155032 | A1 * | 7/2005 | Schantz ........................ 718/100 |
| 2010/0153956 | A1 | 6/2010 | Capps et al. |
| 2012/0005535 | A1 | 1/2012 | Shigehara |
| 2012/0278800 | A1 * | 11/2012 | Nicholas et al. .................. 718/1 |
| 2013/0080375 | A1 * | 3/2013 | Viswanathan et al. .......... 706/52 |

FOREIGN PATENT DOCUMENTS

| CN | 1456990 A | 11/2003 |
| KR | 20060080666 A | 7/2006 |
| WO | WO 2010106403 A1 * | 9/2010 |

OTHER PUBLICATIONS

Kumar et al. (Core Architecture Optimization for Heterogeneous Chip Multiprocessors), Sep. 2006, 10 Pages.*

(Continued)

*Primary Examiner* — Kevin Bates
*Assistant Examiner* — Jeyanath Jeyaratnam
(74) *Attorney, Agent, or Firm* — Cantor Colburn LLP; William A. Kinnaman, Jr.

(57) ABSTRACT

One or more measurements of processor utilization are taken. A utilization ceiling is calculated. One or more processing units (PUs) are added automatically if it is determined that the utilization ceiling is greater than an available PU capacity. One or more PUs are removed automatically responsive to determining that the utilization ceiling is at least one PU less than the available PU capacity.

10 Claims, 4 Drawing Sheets

(56) References Cited

OTHER PUBLICATIONS

Winckler, Andreas, "Scheduling of Near-Future Workload in Distributed Computin Systems," IEEE Tencon; Beijing; p. 169-172, 1993.
Wu, Yongwei, et al., "Adaptive Workload Prediction of Grid Performance in Confidence Windows," IEEE Transactions on Parallel and Distributed Systems; vol. 21; No. 7, p. 925-938 Jul. 2010.
Ganapathi, Archana et al., "Statistics-Driven Workload Modeling for the Cloud," ICDE Workshops; IEEE; p. 1-6, 2010.
Singh, Nidhi and Rao, Shrisha, "Modeling and Reducing Power Consumption in Large IT Systems," IEEE, p. 1-6, 2010.
Wildstrom, Jonathan et al., "Towards Self-Configuring Hardware for Distributed Computer Systems," Proceedings of the Second International Conference on Autonomic Computing; IEEE; p. 1-9, 2005.

* cited by examiner

| M | P(u>M) |
|---|---|
| $\mu + \sigma$ | 16% |
| $\mu + 1.28\sigma$ | 10% |
| $\mu + 1.65\sigma$ | 5% |
| $\mu + 2.06\sigma$ | 2% |

PROGRAMMATIC LOAD-BASED MANAGEMENT OF PROCESSOR POPULATION

BACKGROUND

This invention relates generally to processing within a computing environment, and more particularly to the programmatic management of processor population.

In a computing system provided with N functionally equivalent computer processing units (PUs), the workload running on the system will often consume less computational power than the N PUs can provide in aggregate. Quantitatively, this may be expressed as, "The system is less than N*100% utilized." For example, if N=16, full utilization would be 1600%, and a workload that consumes only half of the available capacity would be said to run at 800% utilization.

Multiprocessing-capable operating systems dispatching such workloads often distribute the workloads evenly over the N PUs. Continuing the above example, the dispatcher might run each of the 16 functionally identical PUs at 50% utilization, thereby providing the workload with sufficient power.

In some computing systems, due to the overhead of managing multiple PUs, the processor cache structure of the machine, and the increasing need for operating system locking and mutual exclusion as multiprocessing level increases, such equitable distribution is not always the most efficient way to distribute such a workload. Returning again to the example, it might make more sense for the operating system kernel to run that 800% workload as 10 processors running at 80% utilization, with the remaining six processors idle.

BRIEF SUMMARY

An embodiment includes a computer implemented method. The method includes taking one or more measurements of processor utilization. A utilization ceiling is calculated. One or more processing units (PUs) are added automatically if it is determined that the utilization ceiling is greater than an available PU capacity. One or more PUs are removed automatically responsive to determining that the utilization ceiling is at least one PU less than the available PU capacity.

An additional embodiment includes a system. The system includes a computer processor configured to take one or more measurements of processor utilization. A utilization ceiling is calculated. One or more processing units (PUs) are added automatically if it is determined that the utilization ceiling is greater than an available PU capacity. One or more PUs are removed automatically responsive to determining that the utilization ceiling is at least one PU less than the available PU capacity.

An additional embodiment includes a tangible storage medium readable by a processing circuit and storing instructions for execution by the processing circuit for performing a method. The method includes taking one or more measurements of processor utilization. A utilization ceiling is calculated. One or more processing units (PUs) are added automatically if it is determined that the utilization ceiling is greater than an available PU capacity. One or more PUs are removed automatically responsive to determining that the utilization ceiling is at least one PU less than the available PU capacity.

A further embodiment includes a computer implemented method. The method includes taking one or more measurements of processor utilization. First and second utilization ceiling are calculated. One or more processing units (PUs) are automatically added if it is determined that the larger of the first utilization ceiling and the second utilization ceiling is greater than an available PU capacity. One or more PUs are automatically removed if it is determined that the larger of the first utilization ceiling and the second utilization ceiling is at least one PU less than the available PU capacity.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

An embodiment of the present invention provides for programmatic management of processor configuration.

Figure 3:
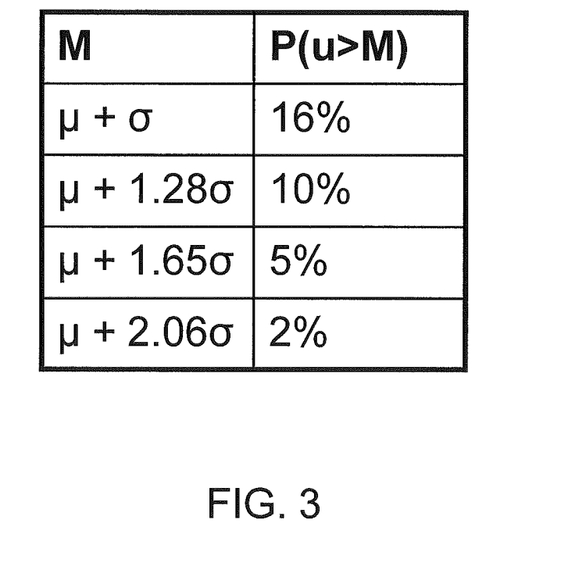
FIG. 3 depicts a mathematical table of values that relates random variable values to percentage likelihoods that samples above those values will occur according to an embodiment.

An embodiment includes calculating the mean processing load over time, along with the standard deviation. Based on the processing load's mean and processing load's standard deviation, and given a confidence percentage P specified by the system administrator, a load ceiling C is calculated that the actual load in the next interval is only P% likely to exceed. In an embodiment, to make this calculation the table in FIG. 3 is used. For example, if the system administrator wants to manage for a 2% probability of failure, the ceiling C would be $\mu+2.06*\sigma$. Then, based on how many CPUs are turned on at that point in time, it is determined whether more CPUs are needed in order to be able to handle C. If more CPUs are needed, then additional CPUs are turned on until the combination of CPUs is able to handle C. If fewer CPUs are needed to handle C, then the extra CPUs are turned off.

Large computer systems operate under varying loads. Often, these computer systems are oversized in order to ensure that, under the highest expected demand, the system will have enough processing power to support the entire load. The processing power is provided by adding additional PUs to the computer system. A PU may include a single computer processor, or a computer core. In an embodiment, a PU is a logical processor. The processing load is typically spread across multiple PUs and, therefore, when the system is under less than a maximal load, each of the processors may have a significant amount of underutilized processing power.

An operating system's task management system spreads the work among the processors, and by doing so, incurs processing overhead such as locking for mutual exclusion. In addition, as processing is transferred from PU to PU the associated cache data and instructions must be moved as well. In a large system, this overhead could be significant and may have a substantial impact on the overall system processing time.

Some of the overhead may be mitigated manually by turning off PUs when the load on the system is anticipated to be low. This manual adjustment of PUs, however, cannot accommodate for unexpected bursts of processing volume, and therefore is of limited value. A more intelligent approach is to automatically turn PUs on and off as needed. This will substantially reduce the processor management overhead by running processes on the minimum set of PUs that will support the anticipated load, while having the capability to predict near future changes in the processing requirements, and thereby turning PUs on and off based on the overall system's anticipated needs.

Figure 1:
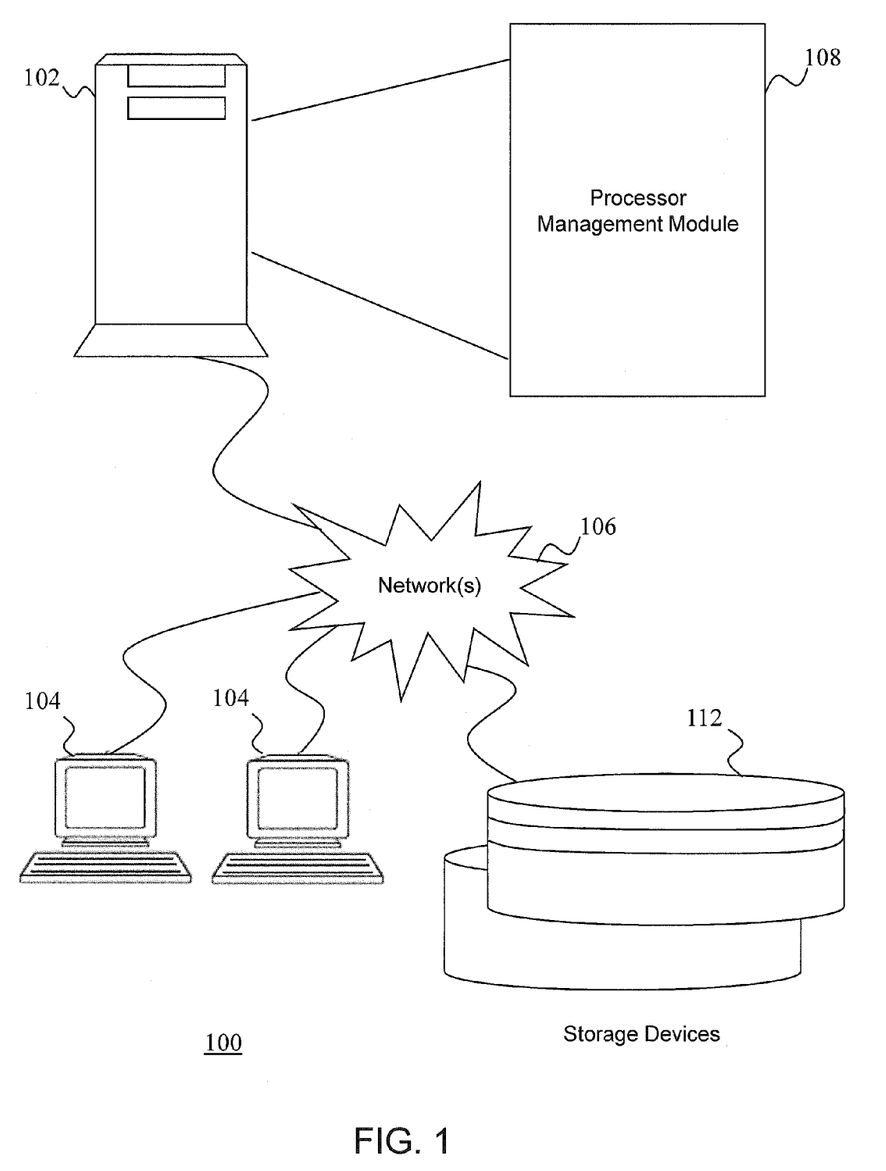
FIG. 1 depicts a schematic diagram of a system for implementing programmatic management of processor population that may be implemented by an embodiment.

Turning now to FIG. 1, a system 100 for implementing programmatic management of processor population will now be described. In an embodiment, the system 100 includes a host system computer 102 executing computer instructions to: 1) run an application workload, and (2) to measure CPU utilization as input to programmatic management of the PU configuration, and (3) to turn on or turn off PUs according to projections of near-future needs for capacity. Host system computer 102 may operate in any type of environment that is capable of executing a software application. Host system computer 102 may comprise a high-speed computer processing device, such as a mainframe computer. In an embodiment, the host system computer 102 is part of an enterprise (e.g., a commercial business) that uses programmatic techniques to manage CPU configuration based on projected demand for CPU power.

In an embodiment, the system 100 depicted in FIG. 1 includes one or more client systems 104 through which users at one or more geographic locations may contact the host system computer 102. The client systems 104 are coupled to the host system computer 102 via one or more networks 106. Each client system 104 may be implemented using a general-purpose computer executing a computer program for carrying out the processes described herein. The client systems 104 may be personal computers (e.g., a lap top, a personal digital assistant, a mobile device) or host attached terminals. If the client systems 104 are personal computers, the processing described herein may be shared by a client system 104 and the host system computer 102 (e.g., by providing an applet to the client system 104). Client systems 104 may be operated by authorized users (e.g., programmers) for accessing applications executing on the host system 102, such as web servers, database servers, etc.

The networks 106 may be any type of known network including, but not limited to, a wide area network (WAN), a local area network (LAN), a global network (e.g., Internet), a virtual private network (VPN), and an intranet. The networks 106 may be implemented using a wireless network or any kind of physical network implementation known in the art. A client system 104 may be coupled to the host system computer 102 through multiple networks (e.g., intranet and Internet) so that not all client systems 104 are coupled to the host system computer 102 through the same network. One or more of the client systems 104 and the host system computer 102 may be connected to the networks 106 in a wireless fashion. In one embodiment, the networks 106 include an intranet and one or more client systems 104 executing a user interface application (e.g., a web browser) to contact the host system computer 102 through the networks 106. In another embodiment, the client system 104 is connected directly (i.e., not through the networks 106) to the host system computer 102 and the host system computer 102 contains memory for storing data in support of programmatic management of processor population. Alternatively, a separate storage device (e.g., storage device 112) may be implemented for this purpose.

In an embodiment, the storage device 112 includes a data repository with data relating to programmatic management of processor population by the system 100, as well as other data/information desired by the entity representing the host system computer 102 of FIG. 1. The storage device 112 is logically addressable as a consolidated data source across a distributed environment that includes networks 106. Information stored in the storage device 112 may be retrieved and manipulated via the host system computer 102 and/or the client systems 104. In an embodiment, the storage device 112 includes one or more databases containing, e.g., configuration parameters, values, methods, and properties, as well as other related information as will be discussed more fully below. It will be understood by those of ordinary skill in the art that the storage device 112 may also comprise other structures, such as an XML file on the file system or distributed over a network (e.g., one of networks 106), or from a data stream from another server located on a network 106. In addition, all or a portion of the storage device 112 may alternatively be located on a client system 104.

The host system computer 102 depicted in the system of FIG. 1 may be implemented using one or more servers operating in response to a computer program stored in a storage medium accessible by the server. The host system computer 102 may operate as a network server (e.g., a web server) to communicate with the client systems 104. The host system computer 102 handles sending and receiving information to and from the client systems 104 and can perform associated tasks. The host system computer 102 may also include a firewall to prevent unauthorized access to the host system computer 102 and enforce any limitations on authorized access. For instance, an administrator may have access to the entire system and have authority to modify portions of the system. A firewall may be implemented using conventional hardware and/or software as is known in the art.

The host system computer 102 may also operate as an application server. The host system computer 102 executes one or more computer programs to provide the programmatic management of processor configuration. The host system computer 102 includes a processor management module 108. As indicated above, processing may be shared by the client systems 104 and the host system computer 102 by providing an application (e.g., java applet) to the client systems 104. Alternatively, the client system 104 can include a stand-alone software application for performing a portion or all of the processing described herein. As previously described, it is understood that separate servers may be utilized to implement the network server functions and the application server functions. Alternatively, the network server, the firewall, and the application server may be implemented by a single server executing computer programs to perform the requisite functions.

In an embodiment, the processor management module 108 is executed on the host computer system along with the workload that is distributed across the PUs. In an additional embodiment, the processor management module 108 is executed on a separate computer system, which is not executing the workload.

It will be understood that the programmatic management of processor population described in FIG. 1 may be implemented in hardware, software executing on a general purpose computer, or a combination thereof.

Figure 2:
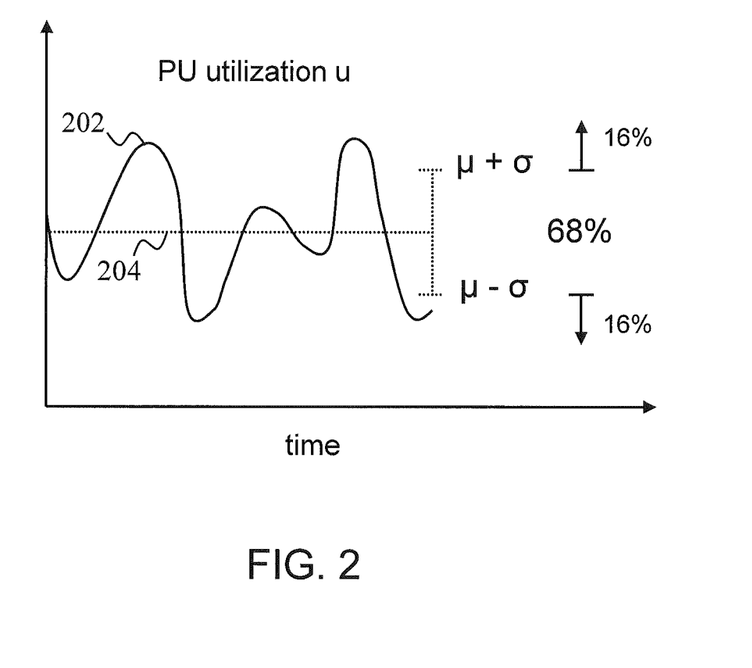
FIG. 2 depicts a graph of processor unit utilization in an embodiment.

FIG. 2 depicts a graph of PU utilization in an embodiment. The PU utilization curve 202 indicates actual PU utilization over time. Based on the PU utilization curve 202 a utilization mean (μ) 204 is calculated. The utilization mean 204 is the mean PU utilization over the time calculated for the PU utilization curve 202. Based on the PU utilization curve 202 and the utilization mean 204, a standard deviation (σ) is calculated. It will be understood that the graph of FIG. 2, and the values in the graph are purposes of illustration only, and that embodiments are not limited to any specific values. Furthermore, the values themselves are calculated, however, the generation of a graph is not required, and the values themselves are used to determine PU requirements of the system.

FIG. 3 depicts a mathematical table of values that relates random variable values to percentage likelihoods that samples above those values will occur. Column M indicates a number of standard deviations from the mean PU utilization calculated, for example, from the data of FIG. 2. The second column is the calculated probability that the utilization requirements of system will exceed the value in the column M. Therefore, according to the table of FIG. 3, there is a 16% probability that, during the following time interval, the PU utilization will exceed one standard deviation above the mean PU utilization. The number of PUs that are needed is projected using this probability value. In an embodiment, the risk that a given value M will be exceeded is measured against the risk that a user is willing to incur. For example, assuming that a user is willing to incur a 2% risk that the actual utilization will exceed M, then the number of PUs that will be brought online will need to be able to support the current mean processor utilization value plus 2.06 standard deviations. The PU count will therefore be adjusted accordingly, as will be discussed in more detail below.

It will be understood that the values in the table of FIG. 3 are purposes of illustration only, and that embodiments are not limited to any specific values.

In an embodiment, the data and the probability calculations are produced at regular time intervals for the system as a whole. In an additional embodiment, the system comprises a number of heterogeneous PUs and, the data and probability calculations are produced for each type of PU.

Figure 4:
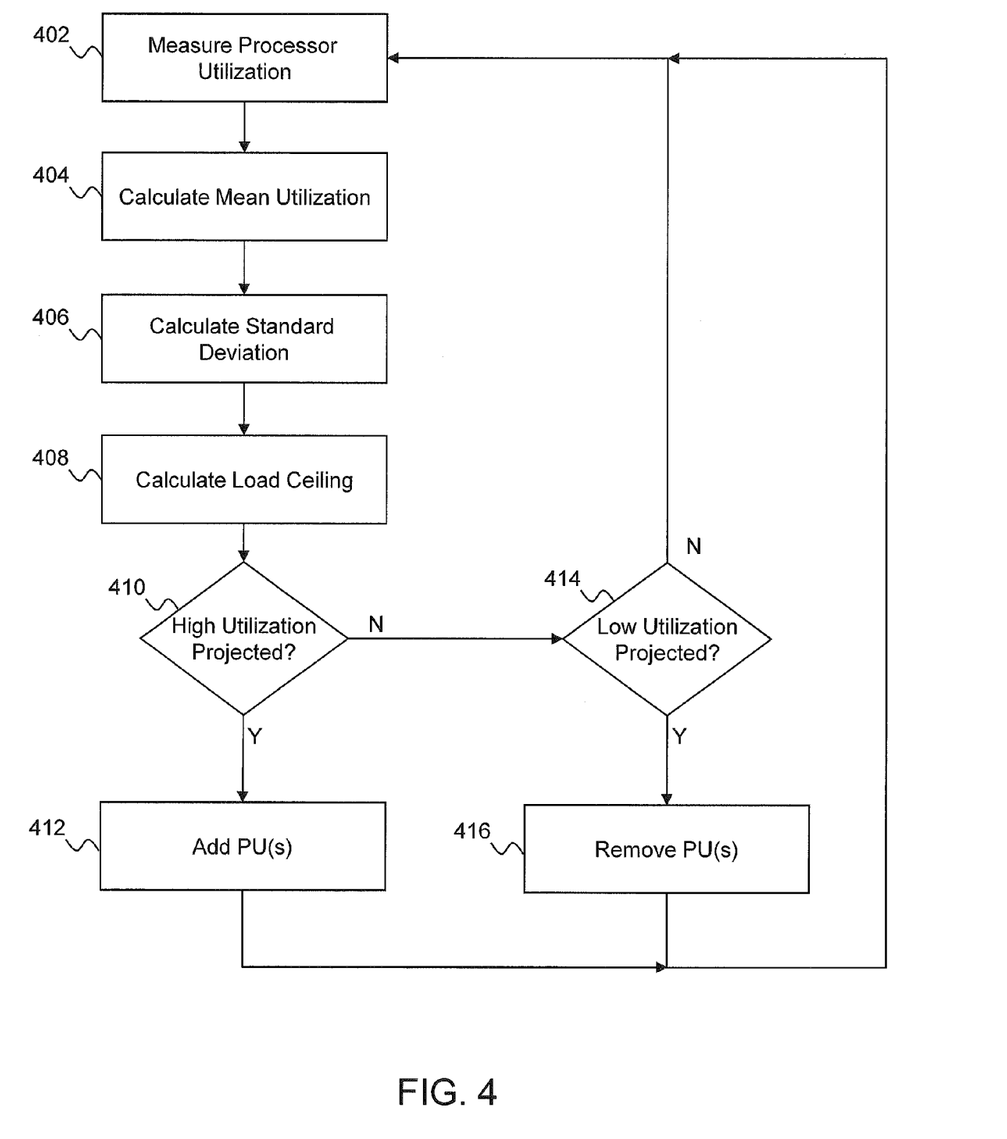
FIG. 4 depicts a process flow for programmatic management of processor population that may be implemented in an embodiment.

FIG. 4 depicts a process flow for programmatic management of processor population that may be implemented in an embodiment. In an embodiment, the process flow of FIG. 4 is executed on a processor management module, such as the processor management module 108 of FIG. 1. At block 402, current processor utilization is measured. In an embodiment, previous processor utilization values are cached, and the current processor utilization is added to the cache. At block 404, the mean utilization for a time period X is calculated. In an embodiment, such as at system startup, for example, the mean utilization step waits to accrue data for the time period X. At block 406, a standard deviation of the PU utilization data is calculated. At block 408, the CPU load ceiling C is calculated that is only P % percent likely to occur, where P was chosen by the system administrator, and using the CPU load mean, the CPU load standard deviation, and the appropriate row value of FIG. 3. At block 410, the calculated load ceiling is compared to the number of PUs currently online. If C is likely to exceed the number of PUs that are currently online, at block 412, one or more additional PUs are brought online in order to meet the calculated ceiling C, and processing continues at block 402. Otherwise, if C does not exceed the number of PUs that are online by, for example, a utilization threshold, then processing continues at block 414, where it is determined if the calculated processing ceiling C is at least one PU less than the number of PUs currently online, i.e., if one or more PUs can be deactivated. If it is determined that one or more PUs can be deactivated, then at block 416, one or more PUs is deactivated. Processing then continues at block 402.

Returning to block 414, if C is not likely to be at least one PU less than the number of PUs currently online, then processing continues at block 402. In an embodiment, the process flow of FIG. 4 is used to compare the calculated ceiling C with the number of PUs currently online and adjust the number of PUs online of the system as a whole. In an additional embodiment, the system comprises a number of heterogeneous PUs, and the process flow of FIG. 4 is executed for each of the various PU types.

Figure 5:
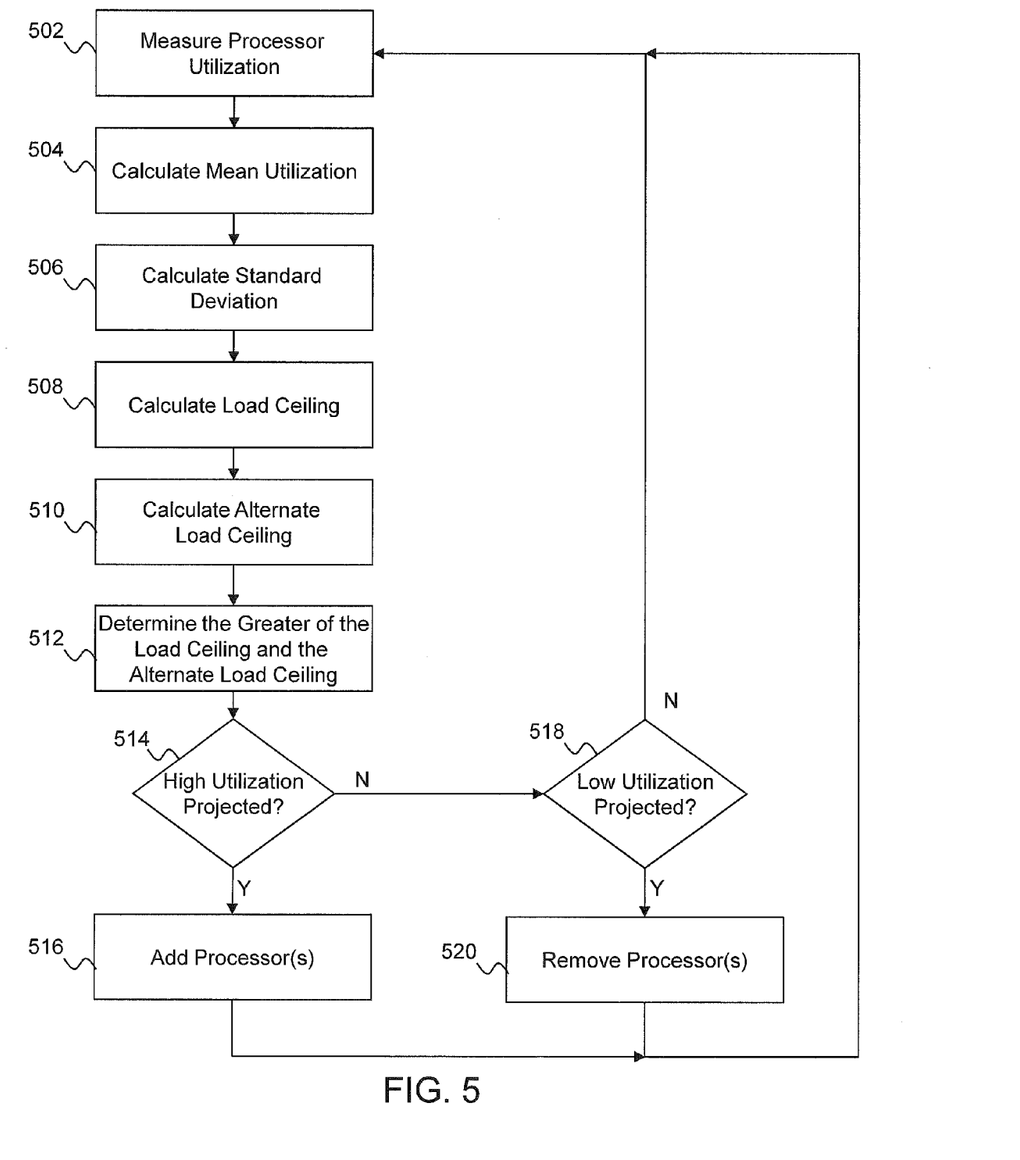
FIG. 5 depicts a process flow for programmatic management of processor population that may be implemented in an additional embodiment.

FIG. 5 depicts a process flow for programmatic management of processor population that may be implemented in an additional embodiment. In an embodiment, the process flow of FIG. 5 is executed on a processor management module, such as the processor management module 108 of FIG. 1. At block 502, current processor utilization is measured. In an embodiment, previous processor utilization values are cached, and the current processor utilization is added to the cache. At block 504, the mean utilization for a time period X is calculated. In an embodiment, such as at system startup, for example, the mean utilization step waits to accrue data for the time period X. At block 506, a standard deviation of the PU utilization data is calculated. At block 508, the CPU load ceiling C is calculated that is only P% percent likely to occur, where P was chosen by the system administrator, and using the CPU load mean, the CPU load standard deviation, and the appropriate row value of FIG. 3. At block 510, an alternate load ceiling C' is chosen based on the magnitudes of the last two actual utilization observations and their difference. In other words, the alternate load ceiling C' is (last sample)+(last sample minus the next to last sample). At block 512, the greater of the load ceiling C and the alternate load ceiling C' is determined (referred to herein as C''). At block 514, C'' is compared to the number of PUs currently online. If the C'' is larger than the number of PU's currently online, at block 516, one or more additional PUs are brought online in order to meet the processor ceiling C'', and processing continues at block 502. Otherwise, if the C'' does not exceed the number of PUs currently online, then processing continues at block 518, where it is determined if the calculated processing ceiling C'' is at least one PU less than the number of PUs currently online, i.e., if one or more PUs can be deactivated. If it is determined that one or more PUs can be deactivated, then at block 520, one or more PUs is deactivated. Processing then continues at block 502.

Returning to block 518, if C'' is not likely to be at least one PU less than the number of PUs currently online, then processing continues at block 502. In an embodiment, the process flow of FIG. 5 is used to compare the calculated ceiling C'' with the number of PUs currently online and adjust the number of PUs online of the system as a whole. In an additional embodiment, the system comprises a number of heterogeneous PUs, and the process flow of FIG. 5 is executed for each of the various PU types.

In an embodiment, either of the flows depicted in FIGS. 4 and 5 may be modified by adding a constant value Z to the projected processor utilization values, thereby increasing the number of PUs by the projected value plus Z to create a processing buffer.

Technical effects and benefits include reducing processor overhead by consolidating workloads on the minimum set of PUs required to process the workload. An additional benefit is the ability to predict, in real time, the needed processor population of a set of PUs, and the ability to increase the number of PUs to meet the projected workload. Yet another benefit is the ability to predict processor utilization across groups of heterogeneous PUs, for each group of PUs of a given type.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or schematic diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As described above, embodiments can be embodied in the form of computer-implemented processes and apparatuses for practicing those processes. In embodiments, the invention is embodied in computer program code executed by one or more network elements. Embodiments include a computer program product on a computer usable medium with computer program code logic containing instructions embodied in tangible media as an article of manufacture. Exemplary articles of manufacture for computer usable medium may include floppy diskettes, CD-ROMs, hard drives, universal serial bus (USB) flash drives, or any other computer-readable storage medium, wherein, when the computer program code logic is loaded into and executed by a computer, the computer becomes an apparatus for practicing the invention. Embodiments include computer program code logic, for example, whether stored in a storage medium, loaded into and/or executed by a computer, or transmitted over some transmission medium, such as over electrical wiring or cabling, through fiber optics, or via electromagnetic radiation, wherein, when the computer program code logic is loaded into and executed by a computer, the computer becomes an apparatus for practicing the invention. When implemented on a general-purpose microprocessor, the computer program code logic segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method comprising:
    taking one or more measurements of processor utilization, each measurement indicative of utilization of a plurality of a processing units collectively;
    calculating, by a computer, a utilization ceiling, wherein the utilization ceiling is indicative of a likelihood of a failure of a load in a next interval based on an available processing unit (PU) capacity, wherein the failure of the load is caused by the load exceeding the available PU capacity;
    adding, automatically, one or more processing units responsive to determining that the utilization ceiling is greater than the available PU capacity; and
    removing, automatically, one or more processing units responsive to determining that the utilization ceiling is at least one PU less than the available PU capacity, wherein the one or more processing units are physical processors,
    wherein the utilization ceiling is a sum of a mean processor utilization and a scaled standard deviation of processor utilization, wherein the scaled standard deviation is obtained by scaling a standard deviation of processor utilization by a scaling factor based on a received acceptable failure rate.

2. The computer implemented method of claim 1, wherein the one or more PUs are heterogeneous, the PUs are grouped by type, and the taking of one or more measurements is performed for each group of PUs.

3. The computer implemented method of claim 2, wherein the adding further comprises adding the one or more PUs to a group responsive to determining that the utilization ceiling exceeds a PU capacity of the group.

4. The computer implemented method of claim 1, wherein the adding is responsive to determining that the utilization ceiling plus a constant value will exceed the available PU capacity.

5. The computer implemented method of claim 1, wherein the one or more PUs are one of a computer processor, a processor core, and a logical processor.

6. A computer program product comprising a non-transitory tangible storage medium readable by a processing circuit and storing instructions for execution by the processing circuit for performing a method comprising:
    recordinq a plurality of processor utilization measurements, each measurement indicative of a collective utilization of a plurality of processing units in the processor;
    calculating, on a computer, a first utilization ceiling, wherein the utilization ceiling is indicative of a likelihood of a failure of a load in a next interval based on an available processing unit (PU) capacity and wherein the failure of the load is caused by the load exceeding the available PU capacity, wherein calculating the first utilization ceiling comprises:
        determining a mean processor utilization based on the plurality of processor utilization measurements monitored over a predetermined duration;
        determining a standard deviation of processor utilization based on the mean processor utilization;
        determining a scaling factor based on an acceptable failure rate received; and
        determining the utilization ceiling as a sum of the standard deviation scaled by the scaling factor and the mean processor utilization;
    calculating, on the computer, a second utilization ceiling based on the last two processor utilization measurements from the plurality of processor utilization measurements;
    adding, automatically, one or more processing units (PUs) responsive to determining that the larger of the first utilization ceiling and the second utilization ceiling is greater than an available PU capacity; and
    removing, automatically, one or more processing units responsive to determining that the larger of the first utilization ceiling and the second utilization ceiling is at least one PU less than the available PU capacity, wherein the one or more processing units are physical processors.

7. The computer program product of claim 6, wherein the one or more PUs are heterogeneous, the PUs are grouped by type, and the recording of plurality of processor utilization measurements is performed for each group of PUs.

8. The computer program product of claim 7, wherein the adding further comprises adding the one or more PUs to a group responsive to determining that the utilization ceiling exceeds a PU capacity of the group.

9. The computer program product of claim 6, wherein the adding is responsive to determining that the utilization ceiling plus a constant value will exceed the available PU capacity.

10. The computer program product of claim 6, wherein the one or more PUs are one of a computer processor, a processor core, and a logical processor.

* * * * *